Figure 1:
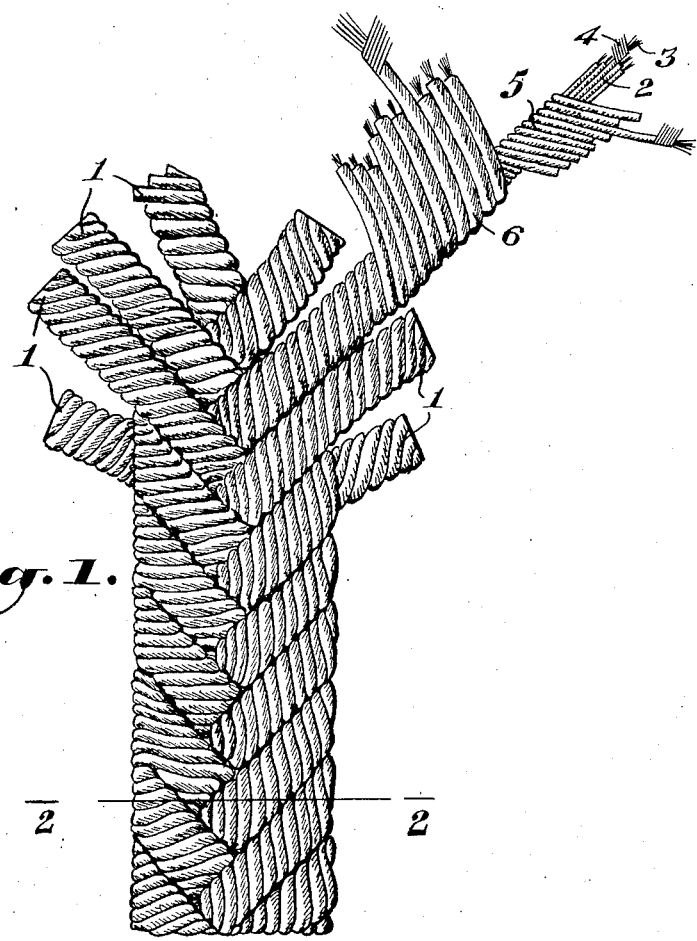

May 3, 1949.

J. F. SALVANS 2,469,178

SQUARE SECTION CABLE FOR
POWER TRANSMISSIONS

Filed Sept. 24, 1945

2 Sheets-Sheet 1

Inventor
Jacinto Folch Salvans

By
Attorneys

May 3, 1949.　　　　J. F. SALVANS　　　　2,469,178
SQUARE SECTION CABLE FOR
POWER TRANSMISSIONS

Filed Sept. 24, 1945　　　　　　　　　　　　2 Sheets-Sheet 2

Inventor
Jacinto Folch Salvans
Attorneys

Patented May 3, 1949

2,469,178

UNITED STATES PATENT OFFICE 2,469,178

SQUARE SECTION CABLE FOR POWER TRANSMISSION

Jacinto Folch Salvans, Barcelona, Spain

Application September 24, 1945, Serial No. 618,164
In Spain August 1, 1945

3 Claims. (Cl. 87—6)

It is well known that transmission cables are made both circular and square in cross section. However, cables made square in cross section possess the following advantages over cables that are circular or round in cross section:

(a) Square cables last longer. If for any reason a strand thereof is broken the ends thereof do not become frayed owing to the fact that the remaining strands are interwoven therewith and protect and hold the strand at the broken ends, so that in consequence it will continue operating. The same does not happen with a cable that is circular in cross section because on the breaking of a strand thereof the latter not being woven with the other strands becomes frayed rendering the cable useless.

(b) Cables of square cross section present a greater contact surface with a pulley than cables of circular cross section, consequently enabling the square cables to transmit a greater pull than a cable of circular section.

On account of the foregoing reasons cables of square cross section are in more frequent use today. However, the majority of cables square in cross section have the disadvantage of being stretchable after being used for a time and this causes continual stoppages due to the necessity of shortening the same and joining the ends together again.

It is therefore the primary object of this invention to provide a cable square in cross section that is practically unstretchable, thereby overcoming the disadvantage mentioned, while in addition, the parts are designed so that use may be made of various vegetable textile fibres, such as cotton, flax, sisal, Manila hemp, agave fibre, etc., when being manufactured.

As an equally important object the invention contemplates the provision of a cable square in cross section composed of eight or nine sections depending on whether or not use is made of a central core.

More particularly the invention consists in the provision of a cable square in cross section, the sections of which are composed of a longitudinally extending threaded core having inner and outer coverings spirally wound thereabout in opposite directions to each other while the core and inner and outer coverings are each in turn composed of a plurality of longitudinally stretched and parallel arranged threads and a covering composed of a plurality of threads arranged side by side to present a tape-like formation which is spirally wound about the longitudinally extending threads.

Other objects, as well as the nature, characteristic features and scope of the invention will be more readily apparent from the following description taken in connection with the accompanying drawings and pointed out in the claims forming a part of this specification.

Figure 2:
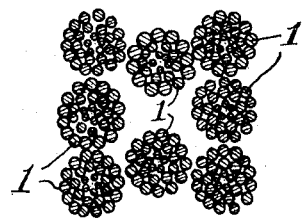
Figure 3:
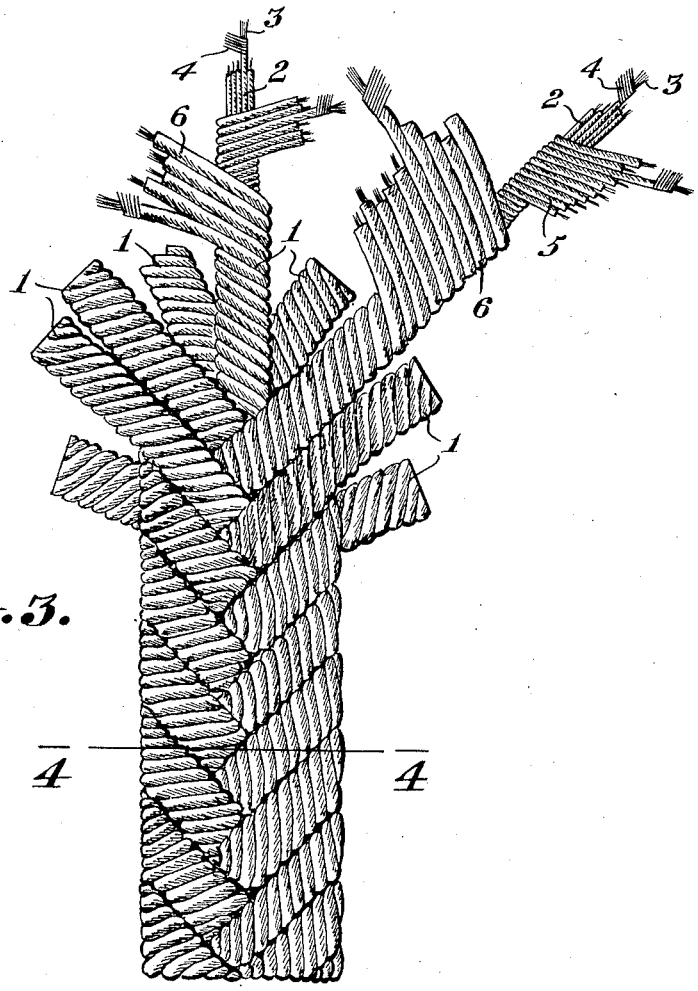
Figure 4:
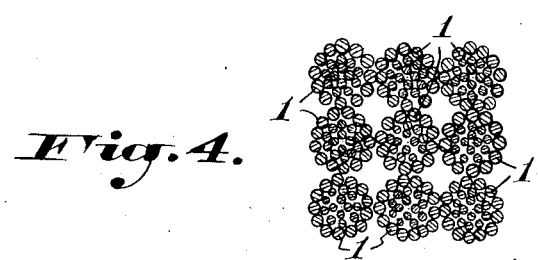

The invention is clearly illustrated in the accompanying drawings, in which:

Figure 1 is an elevational view of one form of the invention without a central core, the sections being extended to show the manner of braiding as well as the construction thereof, Figure 2 is a cross sectional view on line 2—2 of Figure 1, Figure 3 is an elevational view similar to Figure 1 but having nine sections including a central core, and Figure 4 is a cross section on line 4—4 of Figure 3.

Similar characters of reference are employed throughout the several views.

According to Figures 1 and 2 each section or branch 1 is composed of a central core of longitudinally extending and parallel threads 2. Each of the threads 2 is composed in turn of a certain number, for instance, five threads, of fibre arranged in parallel stretched relation to form a core 3 about which is arranged a covering 4 composed of a plurality of threads of cotton or other vegetable fibre arranged side by side to present a tape-like formation which is spirally wound about the longitudinally extending threads forming the core 3.

The core 2 of each branch or section 1 is covered by a cape or covering of threads 5 arranged side by side in a tape-like manner and spirally wound about the core 2 to form an inner covering. Each of the threads 5 is constructed similarly to one of the threads 2 with the understanding that to increase the diameter a greater number of parallel and spiral threads may be used.

The cape of threads 5 forming the inner covering is in turn covered by an outer covering composed of a cape of threads 6 arranged side by side in a tape-like manner and spirally wound thereabout in a direction opposite to the direction of the spirals of the inner covering 5. It is also to be understood that the construction of each thread 6 corresponds substantially to the construction of the threads 2 and 5.

Having assembled the sections 1 in the manner described they are plaited or braided together in a suitable machine to assume the shape illustrated. If the cable has a central core as shown in Figures 3 and 4 the core is held stretched and the remaining eight sections braided together thereabout. If no central core is provided the eight sections comprising the cable are braided directly together. Once the cable is obtained under the above conditions whether or not it has a central core it is evident that it cannot suffer stretching because the cable due to the effect of the strain to which it is subjected, tends to expand the threads 6 forming the outer covering while the inner threads in covering 5 will tend to extend more counteracting consequently any stretching action. On the contrary, if it is the threads 5 that tend to expand, the threads 6 will contract and consequently will counteract such stretching action.

Aside from the foregoing non-stretching characteristics of the cable, there exists another and even more important feature to prevent stretching and this consists in the arranging of the parallel threads of the various cores in a tense and stretched parallel condition during the formation of each of the threads. It is therefore evident that the form shown in Figures 3 and 4 having the central core is preferred. Also the central core prevents the various sections rubbing each other causing a premature wear on the cable.

It is believed in view of the foregoing that a further detailed description of the operation is unnecessary. Likewise, it is believed that the advantages of the invention will be readily apparent.

What is claimed is:

1. A cable for power transmission including a plurality of sections arranged together in such manner as to be rectangular in cross section, each cable section including a longitudinally extending threaded core, an inner threaded covering spirally wound about the core, an outer threaded covering also spirally wound about the inner covering and in an opposite direction to the spiral winding of the inner covering and the threaded core and the inner and outer threaded coverings being each composed of a plurality of longitudinally stretched and parallel arranged threads and a covering composed of a plurality of threads arranged side by side to present a tape-like formation which is spirally wound about the longitudinally extending threads.

2. A power transmission cable as claimed in claim 1 in which the cable sections are at least eight in number and are all closely braided together in such manner that on breakage of any section lengthening or twisting of this cable is prevented due to the particular formation of each cable section and the close braiding relation with respect to the numerous adjacent cable sections.

3. A power transmission cable as claimed in claim 1 in which the cable comprises nine sections one of which constitutes a central core while the remaining eight sections are all closely braided together forming a covering about the core section in such manner that on breakage of any section the ends will not become unduly frayed due to the particular structure of each thread and the close braiding of the sections together.

JACINTO FOLCH SALVANS.

REFERENCES CITED

The following references are of record in the file of this patent:

UNITED STATES PATENTS

| Number | Name | Date |
|---|---|---|
| 206,058 | Travers | July 16, 1878 |
| 1,076,759 | Gore | Oct. 28, 1913 |
| 1,671,267 | Atkins | May 29, 1928 |
| 1,703,269 | Garris | Feb. 26, 1929 |
| 1,975,923 | Christiansen et al. | Oct. 9, 1934 |
| 2,337,986 | Fry | Dec. 23, 1943 |

FOREIGN PATENTS

| Number | Country | Date |
|---|---|---|
| 426,772 | Great Britain | Apr. 9, 1935 |